Dec. 6, 1927.

R. D. SYKES

AERATING MILK AND CREAM CAN COVER

Filed Oct. 16, 1926

1,651,979

Inventor
ROBERT D. SYKES

By
Attorney

Patented Dec. 6, 1927.

1,651,979

UNITED STATES PATENT OFFICE.

ROBERT D. SYKES, OF MINNEAPOLIS, MINNESOTA.

AERATING MILK AND CREAM CAN COVER.

Application filed October 16, 1926. Serial No. 142,112.

This invention relates to milk and cream can covers, and the primary object is to provide a sanitary, durable, practical, and efficient cover which will not only keep out all foreign matter, such as dust, water, insects, dirt, etc., but will effect a thorough ventilation through the can whereby a circulation of air will permit the escape of animal heat, odors and gases during the cooling process and while the milk or cream is in transit. Further and more specific objects will be disclosed in the course of the following specification, reference being had to the accompanying drawing wherein.

Figure 1:
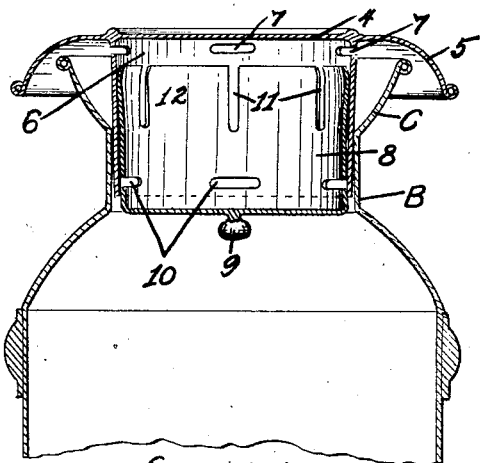
Fig. 1 is a sectional elevation of the upper end of an ordinary cream or milk can, the same being equipped with my improved cover, said cover, however, being adjusted to its non-ventilating position.

Referring to the drawing more particularly and by reference characters, A designates the body of an ordinary milk or cream can, having the usual neck B and a flared flange C.

My improved cover comprises a substantially flat top 4 having a dished flange 5 which overhangs but does not touch the can flange C.

Formed with or permanently secured to the top 4 is a substantially cylindrical sleeve 6, which extends down into the neck B of the can. This sleeve is slightly tapered and is of such size that it will rest in the upper inner edge of the neck B, where the same joins with the flange C, and will thus support the cover in the position shown. The sleeve 6 is provided at its upper end, with an annular series of ventilating slots 7.

Arranged within the sleeve 6 is a cup shaped member 8 having a knob 9 by which it is adjusted. This member 8 is provided near its lower end, with an annular series of slats 10 (similar to 7) through which the ventilation is effected. The upper portion of the cup member 8 is provided with spaced longitudinal curfs or slots 11, dividing the same into a plurality of spring tabs 12. These tabs or sections 12 have an outward spring tendency and thus press outwardly against the sleeve 6 so as to hold the members 6 and 8 in the respective positions, to which they may be adjusted, by friction. These spring members are preferably curved slightly inwardly at their upper ends to facilitate the re-inserting of the cup after the same has been removed for cleaning purposes.

Figure 2:
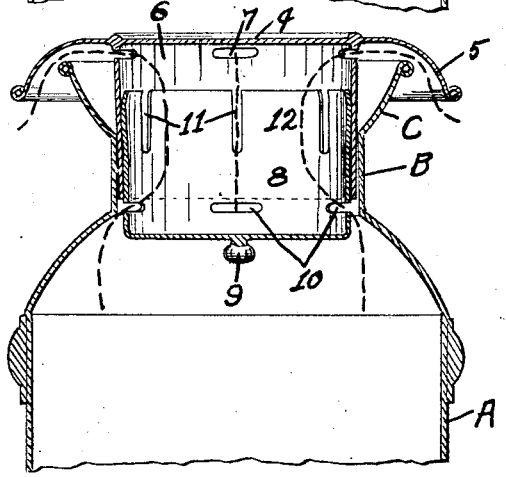
Fig. 2 is a sectional elevation similar to Fig. 1, but showing the cover as adjusted to effect ventilation of the can.
Figure 3:
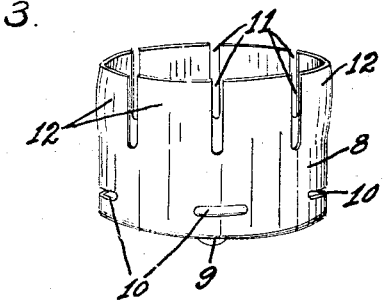
Fig. 3 is a detail perspective view of the cover cup 8.

To aerate the contents of the can, the cover is set into place with the cup 8 in the position shown in Fig. 2. Ventilation takes place via the irregular course described by the dotted lines. It will be noted that the flanges 5 prevent any foreign matter from dropping into the cover or can, while the bottom of the cup 8 acts as a trap for any foreign matter that may enter the cover through the slots or perforations 7. The position of the slots 10 also prevents any of the milk or cream from splashing into the cover. When it is desired to close the cover against circulation through it, it is only necessary to push the cup 8 up into the sleeve 6, so as to close the slots 10, as shown in Fig. 1, or, if so desired, the cup may be pushed up or into the sleeve until it also passes the slots 7 with its upper end.

To thoroughly clean the cover is a very simple matter, it only being necessary to separate the two members 8 and 5-6 and either plunge them into scalding water or otherwise subject them to a suitable cleaning process.

It is understood that suitable modifications may be made in the general design and structural details of the invention as herein shown and described, provided, however, that said modifications come within the spirit and scope of the appended claims. Having now therefore fully shown and described my invention, what I claim to be new and desire to protect by Letters Patent is:

1. A can cover having a slightly tapered sleeve adapted to be supported in the neck of the can, said sleeve having perforations about its upper end, a cup member frictionally secured for vertical adjustment in said sleeve, said cup member having perforations in the lower ends of the wall thereof whereby said last mentioned perforations may be closed by the sleeve when the cup member is adjusted to its uppermost position in the sleeve.

2. A can cover comprising a top having a depending sleeve extending therefrom, a spring acting cup member frictionally secured for longitudinal adjustment in said sleeve, said cup member and sleeve having perforations permitting a passage of air through the cover, when the cup member is in its lower position, said passage being closed when the cup member is in a raised position.

3. A cam cover comprising a pair of substantially cup shaped members one of which is longitudinally adjustable in the other, one of said members being provided with an overhanging peripheral flange, and both of said members being provided with peripheral perforations forming restricted and closable passage through the cover.

4. A cover of the character described comprising a plate having a peripheral, dished flange, a tapered sleeve formed integral with and depending from the plate, said sleeve having an annular series of spaced perforations at its upper end, a cup member arranged within the sleeve and adjustable with respect thereto, said cup member being provided with spring tabs for frictional engagement against the inner surface of the sleeve, and having perforations in its side walls adapted to be closed by the sleeve when the cup member is moved a predetermined distance up into the sleeve.

In testimony whereof I affix my signature.

ROBERT D. SYKES.